US012694618B2

(12) United States Patent
Ho et al.

(10) Patent No.: US 12,694,618 B2
(45) Date of Patent: Jul. 28, 2026

(54) 3D OBJECT IMAGING METHOD AND 3D OBJECT IMAGING SYSTEM

(71) Applicant: Industrial Technology Research Institute, Hsinchu (TW)

(72) Inventors: Tan-Chi Ho, New Taipei City (TW); Shin-Yi Wu, Taoyuan City (TW); Feng Yuan Kuo, Hsinchu County (TW); Su-Shen Hung, Hsinchu City (TW); Chi-Yuan Yeh, Hsinchu City (TW)

(73) Assignee: Industrial Technology Research Institute, Hsinchu (TW)

( * ) Notice: Subject to any disclaimer, the term of this patent is extended or adjusted under 35 U.S.C. 154(b) by 238 days.

(21) Appl. No.: 18/395,642

(22) Filed: Dec. 25, 2023

(65) Prior Publication Data
US 2025/0182399 A1     Jun. 5, 2025

(30) Foreign Application Priority Data

Dec. 5, 2023     (TW) ................................. 112147268

(51) Int. Cl.
*G06T 17/20*          (2006.01)
*G06T 7/00*           (2017.01)
(Continued)

(52) U.S. Cl.
CPC ................ *G06T 17/20* (2013.01); *G06T 7/90* (2017.01); *G06V 10/56* (2022.01); *G06T 2207/10024* (2013.01)

(58) Field of Classification Search
CPC . G06T 17/20; G06T 7/90; G06T 2207/10024; G06V 10/56
See application file for complete search history.

(56) References Cited

U.S. PATENT DOCUMENTS 11,615,602 B2     3/2023   Munkberg et al.
11,676,324 B2     6/2023   Nourai et al.
(Continued)

FOREIGN PATENT DOCUMENTS

CN       115359170       11/2022
CN       115439606       12/2022
(Continued)

OTHER PUBLICATIONS

"Office Action of Taiwan Counterpart Application", issued on Jun. 28, 2024, p. 1-p. 6.
(Continued)

*Primary Examiner* — Michelle Chin
(74) *Attorney, Agent, or Firm* — JCIPRNET

(57)     ABSTRACT

A method of imaging a 3D object, including: obtaining a 3D object generated by a NeRF model in a virtual space; generating a 3D wrapping mesh that completely surrounds the 3D object; sampling color values on the surface of the 3D object based on the 3D wrapping mesh and a 2D mapping mesh mapped to the 3D wrapping mesh, and saves the sampled color values to the 2D mapping mesh; determining, based on a specified viewing angle, a plurality of display rays corresponding to a plurality of mapping pixels of the 2D mapping mesh; obtaining, from the 2D mapping grid, color values of a plurality of display pixels of a 2D display image corresponding to the 3D object in the specified viewing angle based on the display rays; and displaying the display pixels on a display at a user terminal for displaying the 2D display image showing the 3D object.

10 Claims, 9 Drawing Sheets

(51) Int. Cl.
  *G06T 7/90*          (2017.01)
  *G06V 10/56*         (2022.01)

(56)                    References Cited

U.S. PATENT DOCUMENTS

| | | | | | |
|---|---|---|---|---|---|
| 2018/0005432 | A1* | 1/2018 | Breiner | .................. | G06T 15/60 |
| 2022/0051485 | A1* | 2/2022 | Martin Brualla | ....... | G06T 15/04 |
| 2023/0027890 | A1 | 1/2023 | Zhao et al. | | |
| 2023/0143323 | A1* | 5/2023 | Hou | ........................ | G06T 15/60 |
| | | | | | 345/426 |
| 2023/0215085 | A1 | 7/2023 | Olszewski et al. | | |
| 2023/0260200 | A1 | 8/2023 | Aroudj et al. | | |
| 2023/0394740 | A1* | 12/2023 | Kim | ........................ | G06T 15/08 |

FOREIGN PATENT DOCUMENTS

| | | |
|---|---|---|
| CN | 115880378 | 3/2023 |
| CN | 116051719 | 5/2023 |
| CN | 116188698 | 5/2023 |
| CN | 115082639 | 6/2023 |
| CN | 116310076 | 6/2023 |
| CN | 116996707 | 11/2023 |
| TW | 201401874 | 1/2014 |

OTHER PUBLICATIONS

Ben Mildenhall et al., "NeRF: Representing Scenes as Neural Radiance Fields for View Synthesis", European Conference on Computer Vision (ECCV) 2020 (oral), arXiv:2003.08934, Aug. 3, 2020, pp. 1-25.

Jonathan T. Barron et al., "Mip-NeRF: A Multiscale Representation for Anti-Aliasing Neural Radiance Fields", IEEE International Conference on Computer Vision, Mar. 24, 2021, pp. 5855-5864.

Thomas Muller et al., "Instant Neural Graphics Primitives with a Multiresolution Hash Encoding", ACM Transactions on Graphics, vol. 41, No. 4, Article No. 102, Jul. 22, 2022, pp. 1-15.

Anpei Chen et al., "TensoRF: Tensorial Radiance Fields", European Conference on Computer Vision (ECCV) 2022, Nov. 29, 2022, pp. 1-18.

Jacob Munkberg et al., "Extracting Rriangular 3D Models, Materials, and Lighting From Images", Proceedings of the IEEE/CVF Conference on Computer Vision and Pattern Recognition (CVPR), Jun. 2022, pp. 8280-8290.

Tatsunori Taniai et al., "Neural Inverse Rendering for General Reflectance Photometric Stereo", International Conference on Machine Learning (ICML 2018), May 29, 2018, pp. 1-10.

* cited by examiner

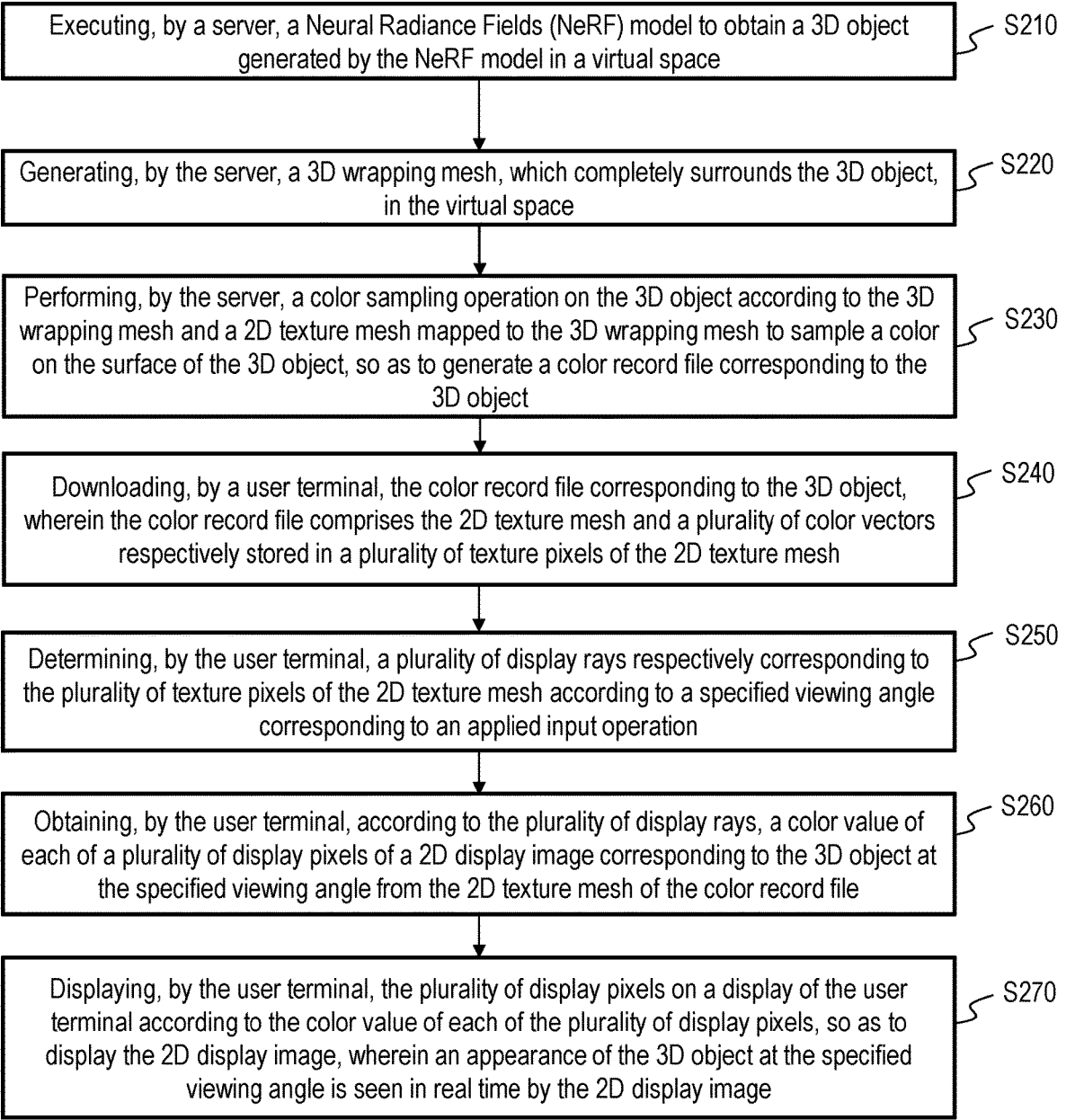

Executing, by a server, a Neural Radiance Fields (NeRF) model to obtain a 3D object generated by the NeRF model in a virtual space — S210

Generating, by the server, a 3D wrapping mesh, which completely surrounds the 3D object, in the virtual space — S220

Performing, by the server, a color sampling operation on the 3D object according to the 3D wrapping mesh and a 2D texture mesh mapped to the 3D wrapping mesh to sample a color on the surface of the 3D object, so as to generate a color record file corresponding to the 3D object — S230

Downloading, by a user terminal, the color record file corresponding to the 3D object, wherein the color record file comprises the 2D texture mesh and a plurality of color vectors respectively stored in a plurality of texture pixels of the 2D texture mesh — S240

Determining, by the user terminal, a plurality of display rays respectively corresponding to the plurality of texture pixels of the 2D texture mesh according to a specified viewing angle corresponding to an applied input operation — S250

Obtaining, by the user terminal, according to the plurality of display rays, a color value of each of a plurality of display pixels of a 2D display image corresponding to the 3D object at the specified viewing angle from the 2D texture mesh of the color record file — S260

Displaying, by the user terminal, the plurality of display pixels on a display of the user terminal according to the color value of each of the plurality of display pixels, so as to display the 2D display image, wherein an appearance of the 3D object at the specified viewing angle is seen in real time by the 2D display image — S270

FIG. 2

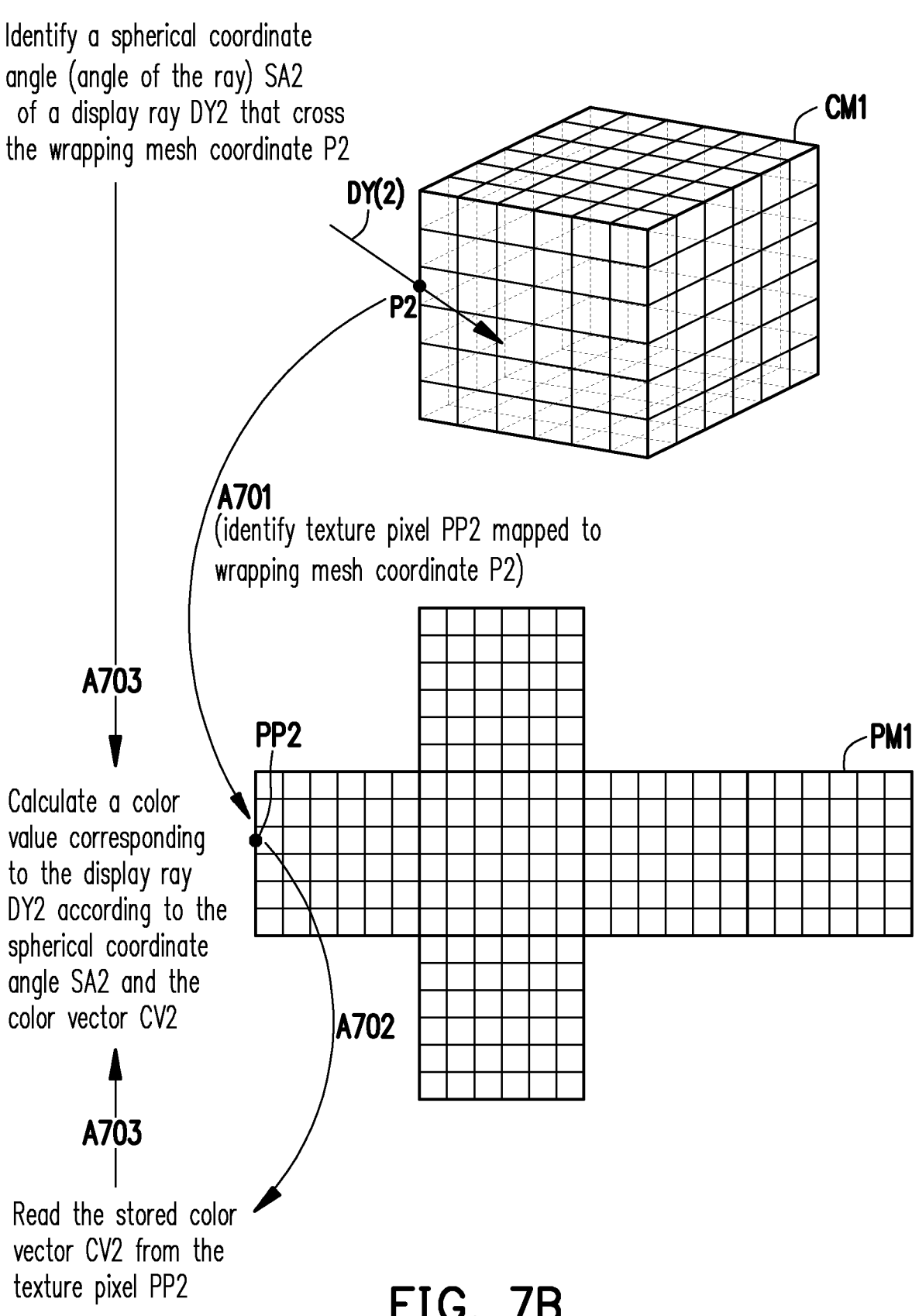

Identify a spherical coordinate angle (angle of the ray) SA2 of a display ray DY2 that cross the wrapping mesh coordinate P2

DY(2)

CM1

P2

A701
(identify texture pixel PP2 mapped to wrapping mesh coordinate P2)

A703

Calculate a color value corresponding to the display ray DY2 according to the spherical coordinate angle SA2 and the color vector CV2

PP2

PM1

A702

A703

Read the stored color vector CV2 from the texture pixel PP2

FIG. 7B

3D OBJECT IMAGING METHOD AND 3D OBJECT IMAGING SYSTEM

CROSS-REFERENCE TO RELATED APPLICATION

This application claims the priority benefit of Taiwan application serial no. 112147268, filed on Dec. 5, 2023. The entirety of the above-mentioned patent application is hereby incorporated by reference herein and made a part of this specification.

BACKGROUND

Technical Field

The present invention relates to an imaging method and to a 3D object imaging method and a 3D object imaging system.

Description of Related Art

In the e-commerce field, 3D product display technology is increasingly becoming the key to enhance consumers' online shopping experience. Neural Radiation Field (NeRF) is an innovative 3D scene and object reconstruction technology that accurately reproduces the surface geometry and texture of physical objects, providing consumers with an extremely realistic viewing experience. This technology not only enhances the user's immersive shopping experience, but is also of great significance in promoting the widespread application of virtual reality (VR) and augmented reality (AR) technologies.

While NeRF technology has shown great potential for visualization, its application to e-commerce platforms has encountered substantial barriers. Traditional NeRF models rely on complex neural networks to describe the density and color of matter in 3D space, a process that requires a large number of derivation operations and relies on high-performance graphics processing units (GPUs). When attempting to use NeRF technology in common e-commerce media such as mobile phones and computer browsers, these devices usually lack the computational power to support real-time 3D image rendering of NeRF models, thus limiting the scope of practical application of the technology.

SUMMARY

An embodiment of the present invention provides a 3D object imaging method for a 3D object imaging system, wherein the system includes a server and a user terminal. The method includes: executing, by the server, a Neural Radiance Fields (NeRF) model to obtain a 3D object generated by the NeRF model in a virtual space; generating, by the server, a 3D wrapping mesh, which completely surrounds the 3D object, in the virtual space; performing, by the server, a color sampling operation on the 3D object according to the 3D wrapping mesh and a 2D texture mesh mapped to the 3D wrapping mesh to sample a color on the surface of the 3D object, so as to generate a color record file corresponding to the 3D object; downloading, by the user terminal, the color record file corresponding to the 3D object, wherein the color record file comprises the 2D texture mesh and a plurality of color vectors respectively stored in a plurality of texture pixels of the 2D texture mesh; determining, by the user terminal, a plurality of display rays respectively corresponding to the plurality of texture pixels of the 2D texture mesh according to a specified viewing angle corresponding to an applied input operation; obtaining, by the user terminal, according to the plurality of display rays, a color value of each of a plurality of display pixels of a 2D display image corresponding to the 3D object at the specified viewing angle from the 2D texture mesh of the color record file; and displaying, by the user terminal, the plurality of display pixels on a display of the user terminal according to the color value of each of the plurality of display pixels, so as to display the 2D display image, wherein an appearance of the 3D object at the specified viewing angle is seen in real time by the 2D display image.

A further embodiment of the present invention provides a 3D object imaging system, comprising a server and a user terminal, wherein the server executes a Neural Radiance Fields (NeRF) model to obtain a 3D object generated by the NeRF model in a virtual space, wherein the server generates a 3D wrapping mesh, which completely surrounds the 3D object, in the virtual space, wherein the server performs a color sampling operation on the 3D object according to the 3D wrapping mesh and a 2D texture mesh mapped to the 3D wrapping mesh to sample a color on the surface of the 3D object, so as to generate a color record file corresponding to the 3D object, wherein the user terminal downloads the color record file corresponding to the 3D object, wherein the color record file comprises the 2D texture mesh and a plurality of color vectors respectively stored in a plurality of texture pixels of the 2D texture mesh, wherein the user terminal determining a plurality of display rays respectively corresponding to the plurality of texture pixels of the 2D texture mesh according to a specified viewing angle, wherein the user terminal obtains, according to the plurality of display rays, a color value of each of a plurality of display pixels of a 2D display image corresponding to the 3D object at the specified viewing angle from the 2D texture mesh of the color record file, wherein the user terminal displays the plurality of display pixels on a display of the user terminal according to the color value of each of the plurality of display pixels, so as to display the 2D display image, wherein an appearance of the 3D object at the specified viewing angle is seen in real time by the 2D display image.

Based on the above, for the needs of 3D product display in e-commerce, an innovative 3D object imaging method to address the limitations of traditional NeRF technology applied on devices with limited processing power is provided. The method includes: generates a 3D wrapping mesh to completely surround the 3D object by the server, and uses the 3D wrapping mesh to pre-sample the 3D object using NeRF technology, and stores the sampled colors in the corresponding 2D texture mesh. Then, at the user terminal, corresponding texture pixels can be quickly extracted from the 2D texture mesh according to a specified viewing angle to display an appearance of the 3D object at the specified viewing angle. The provided method enables e-commerce platforms to instantly present 3D objects in multiple viewpoints by the user terminal, providing a more dynamic and engaging shopping experience.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2 is a flowchart illustrating the operation of a 3D object imaging method according to an embodiment of the present invention.

FIG. 7B is a schematic diagram of obtaining a color value based on a display ray according to an embodiment of the present invention.

DESCRIPTION OF THE EMBODIMENTS

Figure 1:
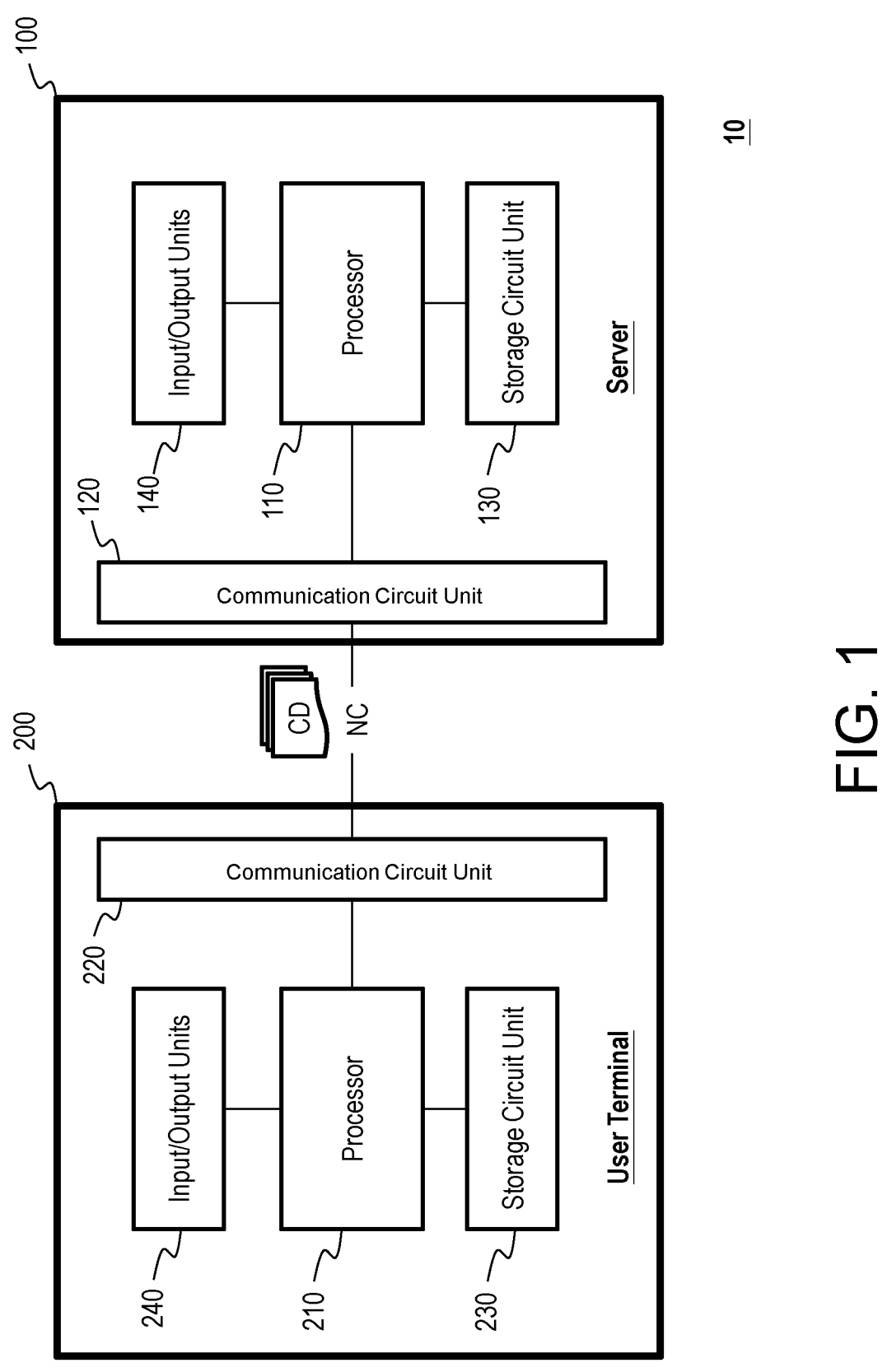
FIG. 1 is a block schematic diagram of a 3D object imaging system according to an embodiment of the present invention.

Referring to FIG. 1, in the embodiment, the 3D object imaging system 10 includes a server 100 and a user terminal 200. The user terminal 200 is, for example, a smart electronic device, a cell phone, a tablet, a personal computer, a laptop, a head-mounted display, and a portable electronic device. The server 100 is, for example, a server of an e-commerce platform or other organization. A network connection NC or a communication connection via the Internet may be established between the server 100 and the user terminal 200.

The server 100 includes a processor 110, a communication circuit unit 120, a storage circuit unit 130, and an input/output unit 140. The user terminal 200 includes a processor 210, a communication circuit unit 220, a storage circuit unit 230, and an input/output unit 240.

The processors 110, 210 are, for example, Microprogrammed Control Units, Central Processing Units (CPUs), programmable Microprocessors, Application Specific Integrated Circuits (ASICs), Programmable Logic Devices (PLDs), or other similar devices, Application Specific Integrated Circuits (ASICs), Programmable Logic Devices (PLDs) or other similar devices. The processors 110 and 210 are used to manage the overall operation of the server 100 and the user terminal 200, respectively.

The communication circuit units 120, 220 are electrically connected to the processors 110, 210, respectively, are configured to transmit or receive data via wired or wireless communication. In the embodiment, one of the communication circuit units 120, 220 may have a wireless communication circuit module (not shown) and support Global System for Mobile Communication (GSM) systems, Personal Handy-phone Systems (PHS), Wireless Fidelity (WiFi), and other wireless communication systems. Wireless Fidelity (WiFi) system, different generations of mobile communication technologies (e.g., 3G-6G), the Bluetooth communication technologies, or a combination thereof, and not limited thereto. The communication circuit units 120, 220 are used to establish a network connection NC or other communication connection.

In the embodiment, the user terminal 200 receives data, e.g., a color record file CD, via a network connection NC from a server 100. The server 100 may first use the NeRF model to generate a corresponding 3D object based on photos of multiple viewpoints of an actual object (e.g., a product) and generate a color record file based on the generated 3D object. The color record file contains the color information of each surface of the 3D object at different viewing angles. In this way, when the color record file is read for real-time display/painting of the 3D object, the corresponding 2D image of the 3D object at each viewing angle can be obtained directly without consuming huge computational resources to run the NeRF model again.

The storage circuit units 130, 230 are electrically connected to the processors 110, 210, respectively, and may be directed by the processors 110, 210 to store data. The storage circuit units include any type of hard disk drive (HDD) or non-volatile memory storage device (e.g., SSD). In one embodiment, the storage circuit unit further comprises memory, such as Dynamic Random Access Memory (DRAM), Static Random Access Memory (SRAM), and the like, for temporarily storing instructions or data executed by the processor.

The input/output units 140, 240 include input devices and output devices. The input device is, for example, microphone, touchpad, touch panel, keyboard, mouse, and the like, which are used to allow a user to enter data or to control functions desired by the user. Output devices are, for example, a monitor (which receives data to display an image), speakers, and the like, and the present invention is not limited thereto. In one embodiment, the input/output units 140, 240 may include a touch screen. The touch screen is used to display various information and control interfaces. For example, the input/output unit 240 may display a 2D display image for presenting appearance of a 3D object at a particular viewing angle based on instructions from the processor 210.

Referring to FIG. 2, in step S210, the server 100 executes a Neural Radiance Fields (NeRF) model to obtain a 3D object generated by the NeRF model in a virtual space. Neural Radiation Field is a new technique for 3D reconstruction of objects/scenes. The color values of each point in the scene are learned through neural networks. The goal is to deduce the geometry, appearance, and color of the whole scene/object in different viewpoints by taking multiple photos of the actual scene/object in different viewpoints in the real world. The result can be rendered as a 3D scene/object and shape/appearance/color of a 2D image of the 3D scene/object is changed depending on the set viewing angle. Neural Radiance Fields (NeRF) solves the problem of traditional 3D mesh models and texture mesh that are not able to faithfully represent the surface material properties of an object.

The 3D object generated by the NeRF model reflects the actual appearance of the real object. In an embodiment, the method of generating the 3D object includes: photographing the real object from a plurality of viewpoints to capture a plurality of object images; and inputting the plurality of object images into the NeRF model and the NeRF model performs an inference operation to generate the 3D object reflecting the real object, wherein the 3D object is rotated to simulate the actual appearance of the real object in different viewing angles.

The generation of 3D object/scene images by the neural radiation field requires a volume rendering process. A ray is shot through the 3D scene to each pixel in the corresponding 2D image, and the GPU performs neuroimaging to deduce the color value of each point on the ray and integrates the color values of the points on the ray into the final pixel color value. Due to the high computational complexity of volume rendering and the large number of neural network inferences involved, depicting a 3D object/scene from one viewpoint using the NeRF model can take a lot of computational resources and time, and requires the use of a dedicated graphics chip.

After obtaining the generated 3D object, next, in step S220, the server 100 generates a 3D wrapping mesh, which completely surrounds the 3D object, in the virtual space. The 3D wrapping mesh may be generated using methods such as marching cube, TSDF (Truncated Signed Distance Function), Poisson surface reconstruction, and the like. It can be seen that the processor 110 generates a three-dimensional mesh that completely surrounds the 3D object in virtual space. The shape of the 3D wrapping mesh approximates the 3D object, and the distance between the 3D wrapping mesh and the 3D object does not exceed 2r, wherein r is a sampling range constant value of the NeRF model.

Figure 3:
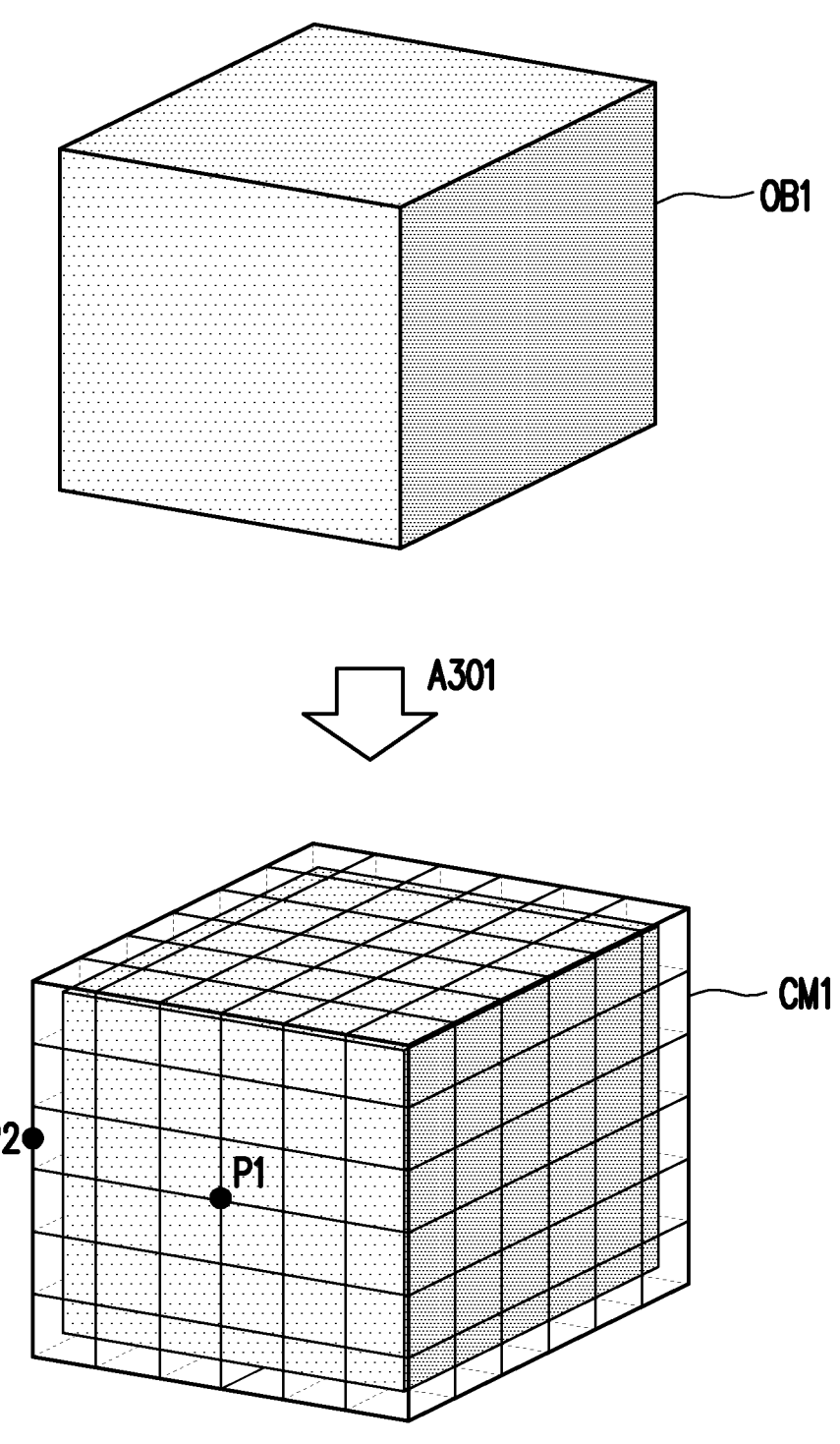
FIG. 3 is a schematic diagram of a 3D wrapping mesh according to an embodiment of the present invention.

Referring to FIG. 3, for example, for the generated 3D object OB1, the processor 110 generates a 3D wrapping mesh CM1 to completely wrap the entire 3D object OB1 (e.g., as shown in arrow A301). Mesh surface of the 3D wrapping mesh CM1 has a plurality of wrapping mesh coordinates (also called as wrapping mesh coordinates points), each of the wrapping mesh coordinates may be at a point where the mesh lines meet (e.g., wrapping mesh coordinate P1) or at a point where the mesh lines do not meet (e.g., wrapping mesh coordinate P2). In an embodiment, the total number of wrapping mesh coordinates may also be equal to the total number of texture pixels of a mapped 2D texture mesh.

In step S230, the server 100 performs a color sampling operation on the 3D object according to the 3D wrapping mesh and a 2D texture mesh mapped to the 3D wrapping mesh to sample a color on the surface of the 3D object, so as to generate a color record file corresponding to the 3D object.

In more detail, step S230 further includes the following steps (1)~(4).

Step (1): generating, by the server, the 2D texture mesh according to the 3D wrapping mesh, where each texture pixel of the 2D texture mesh is mapped to each wrapping mesh coordinate point of the 3D wrapping mesh. For example, referring to FIG. 6, as shown by arrow A601, the processor 110 generates a 2D mesh PM1 (also referred to as, a 2D texture mesh) based on the 3D wrapping mesh CM1. In addition, as shown in arrow A602, each wrapping mesh coordinate (e.g., P2) of the 3D wrapping mesh CM1 is mapped to a texture pixel (e.g., PP2) of the 2D texture mesh PM1. Each texture pixel of the 2D texture mesh PM1 is used as a storage element to store color information (e.g., a color vector) of the mapped wrapping mesh coordinate. For example, texture pixel PP2 stores a color vector corresponding to wrapping mesh coordinate P2.

Figure 4A:
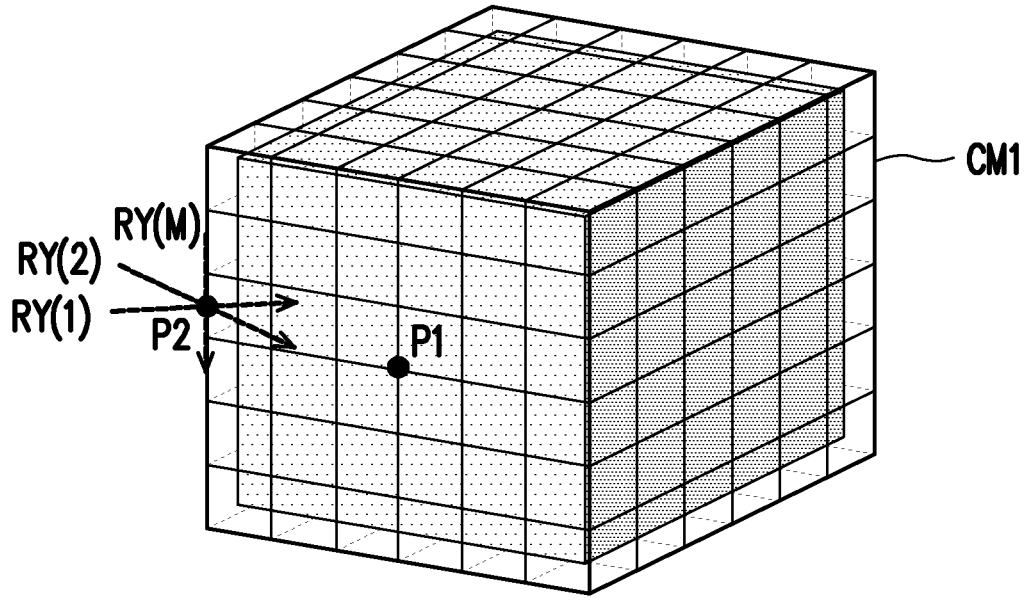
FIG. 4A is a schematic diagram of a plurality of sampling rays corresponding to a wrapping mesh coordinate according to an embodiment of the present invention.

Step (2): performing, by the server, for each wrapping mesh coordinate, following steps: generating, according to the wrapping mesh coordinate, a plurality of sampling rays (e.g., sampling rays RY(1)~RY(M) in FIG. 4A) across the wrapping mesh coordinate with different spherical coordinate angles to obtain, by the plurality of sampling rays and the NeRF model, a plurality of color values respectively corresponding to the plurality of sampling rays.

For example, referring to FIG. 4A, using the wrapping mesh coordinate P2 as an example, the processor 110 may generate a plurality of sampling rays RY(1) to RY(M) crossing the wrapping mesh coordinate P2. M is a predetermined number, which may be set based on the specifications of a sampling cube.

Figure 4B:
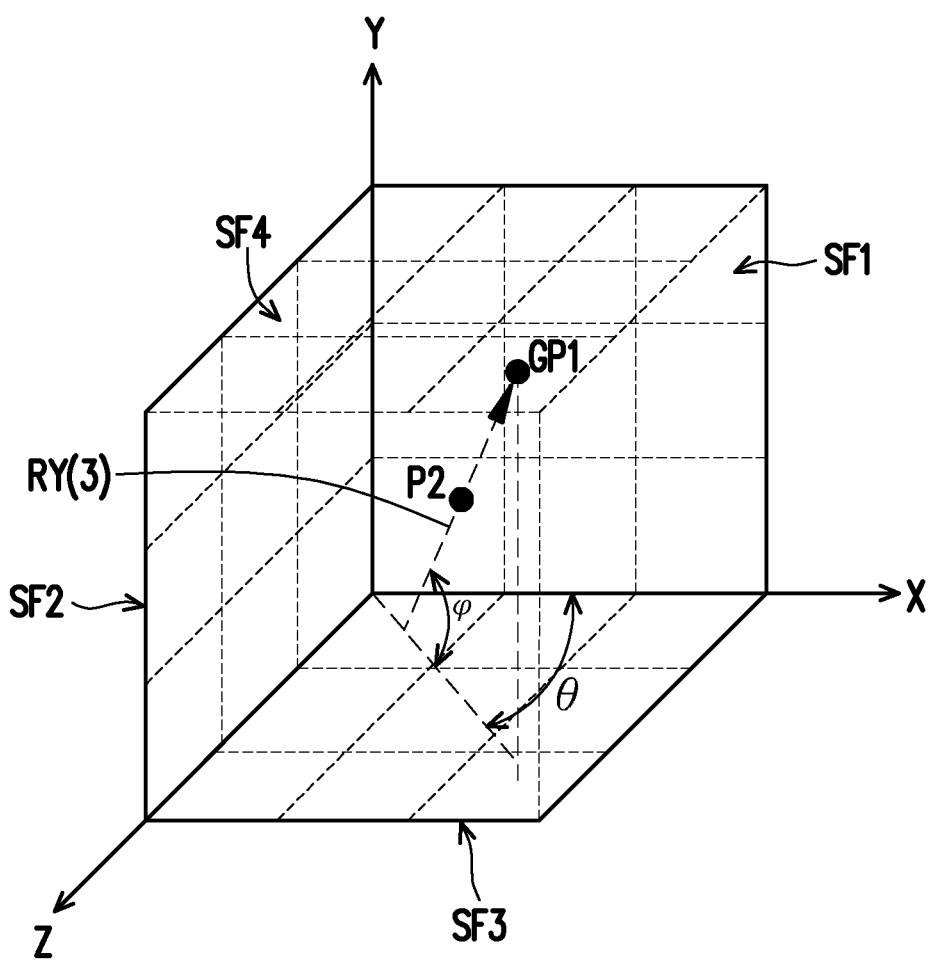
FIG. 4B is a schematic diagram of setting multiple sampling rays according to an embodiment of the present invention.

In more detail, referring to FIG. 4B, to generate sampling rays, pointing in multiple directions, corresponding to the wrapping mesh coordinate P2, a sampling cube can be used to wrap the wrapping mesh coordinate P2 to generate a uniform mesh (e.g., 9 meshes on surface SF4) on each of the six surfaces of the cube (FIG. 4B shows only 4 surfaces SF1~SF4, where surface SF1 corresponds to the X-Y plane, surface SF2 corresponds to the Y-Z plane, surface SF3 corresponds to the X-Z plane, and surface SF4 is on the opposite side of surface SF3 and corresponds to the other X-Z plane). SF3 corresponds to the X-Z plane, and surface SF4 is on the opposite side of surface SF3 and corresponds to another X-Z plane), wherein wrapping mesh coordinate P2 is used as the center of the sampling cube to generate sampling rays to each mesh of the surfaces of the sampling cube. For example, a sampling ray RY(3) is generated based on the center point GP1 in one of the meshes on the surface SF4 and the wrapping mesh coordinate P2. Since the sampling cube in this example has 9 meshes on each side and 6 surfaces in total, a total of 54 sampling rays are generated, i.e., M is 54. It should be noted that the higher number of sampling rays, the more color details of the 3D object can be captured/sampled.

In addition, the processor 110 may further calculate the direction vector (x,y,z) of the sampling ray RY(3) and the corresponding spherical coordinate angle (θ, φ) based on the coordinates of the point GP1 and the wrapping mesh coordinate P2. The spherical coordinate angle (θ, φ) includes an azimuth angle (θ) and a polar angle (φ). The spherical coordinate angles (θ, φ) can be calculated based on the direction vector (x,y,z) by the following equations:

$$r = \sqrt{x^2 + y^2 + z^2}$$

$$\theta = \arccos \frac{z}{\sqrt{x^2 + y^2 + z^2}} = \arccos \frac{z}{r} =$$

$$\begin{cases} \arctan \dfrac{\sqrt{z^2 + y^2}}{z} & \text{if } z > 0 \\ \pi + \arctan \dfrac{\sqrt{x^2 + y^2}}{z} & \text{if } z < 0 \\ +\dfrac{\pi}{2} & \text{if } z = 0 \text{ and } xy \neq 0 \\ \text{undefined} & \text{if } x = y = z = 0 \end{cases}$$

$$\varphi = \text{sgn}(y) \arccos \frac{x}{\sqrt{x^2 + y^2}} = \begin{cases} \arctan\left(\dfrac{y}{x}\right) & \text{if } x > 0, \\ \arctan\left(\dfrac{y}{x}\right) + \pi & \text{if } x < 0 \text{ and } y \geq 0, \\ \arctan\left(\dfrac{y}{x}\right) - \pi & \text{if } x < 0 \text{ and } y < 0, \\ +\dfrac{\pi}{2} & \text{if } x = 0 \text{ and } y > 0, \\ -\dfrac{\pi}{2} & \text{if } x = 0 \text{ and } y < 0, \\ \text{undefined} & \text{if } x = 0 \text{ and } y = 0. \end{cases}$$

It is noted that the length of each sampling ray is limited. In the embodiment, for each of the plurality of sampling rays, a line segment of length 2r is generated as the sampling ray centered at the wrapping mesh coordinate according to the corresponding spherical coordinates angle, wherein r is the sampling range constant value of the NeRF model.

Additionally, the step of to obtaining, by the plurality of sampling rays and the NeRF model, the plurality of color values respectively corresponding to the plurality of sampling rays includes: for each sampling ray among the plurality of sampling rays, determining i sampling points on the sampling ray, wherein i is a positive integer; obtaining, by the NeRF model, an inferred NeRF color and a density value of each of the i sampling points; and integrating the NeRF color values and the density values of the i sampling points to obtain the color value corresponding to the sampling ray.

Figure 5:
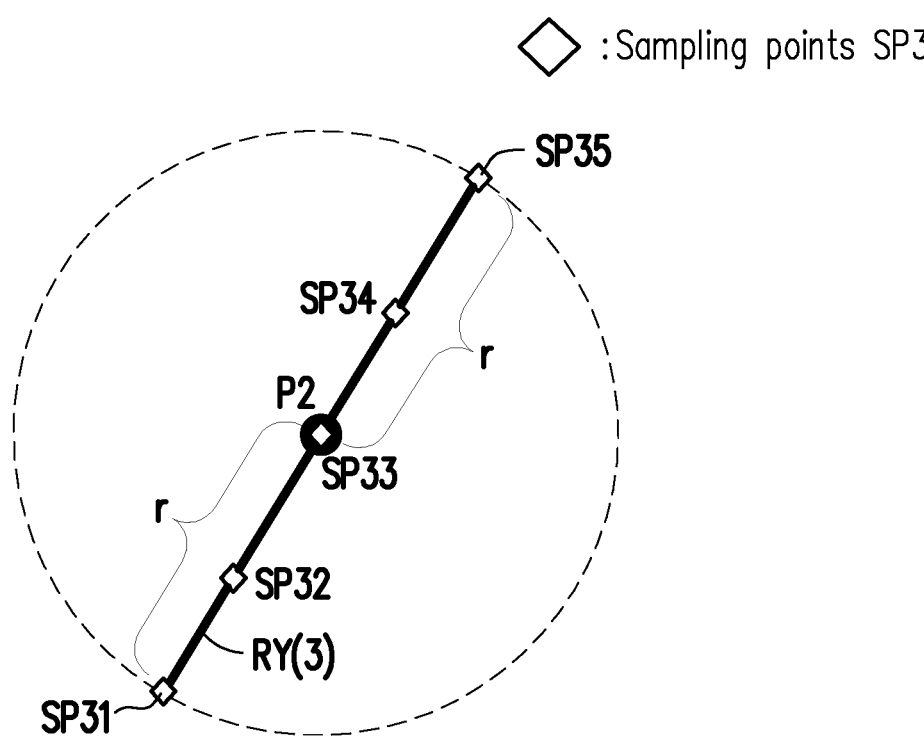
FIG. 5 is a schematic diagram of a plurality of sampling points on a sampling ray according to an embodiment of the present invention.

For example, referring to FIG. 5, the sampling ray RY(3) is used as an example here, and it is assumed that the number of sampling points is a predetermined value, 5. The predetermined value can be a positive integer. The processor 110 generates the sampling ray RY(3) having a length of 2r across the wrapping mesh coordinate P2, wherein the lengths of the front and back sections of the sampling ray RY(3), separated by the wrapping mesh coordinate P2, are each r. Furthermore, the processor 110 is uniformly disposes 5 sampling points SP31~SP35 at the sampling ray RY(3), wherein the sampling points SP31, SP35 are at the two ends of the sampling ray RY(3). The sampling point SP33 is located exactly at the wrapping mesh coordinate P2. It should be noted that the present invention is not limited to a total number of sampling points for one sampling ray (e.g., a total number of sampling points for a sampling ray may be less than 5, e.g., 3; or a total number of sampling points for a sampling ray may be greater than 5, e.g., 100). The more sampling points, the more accurate/correct the sampled color will be, but it will consume more computational resources.

After determining the sampling points SP31~SP35, the processor 110 uses a NeRF model corresponding to the 3D object, inputs the coordinates and spherical coordinate angles of the sampling points SP31~SP35 into the NeRF model to infer the color values (with a three-primary-color vector, e.g., C[R,G,B]) and the density values at the sampling points SP31~SP35 and, according to the following equation to integrate the color values and density values of all sampling points, so as to obtain the composite color values (with a further three-primary-color vector, e.g., Ĉ[R, G,B]).

$$\hat{C}(r) = \sum_{i=1}^{N} T_i (1 - \exp(-\sigma_i \delta_i)) c_i, \text{ where } T_i = \exp\left(-\sum_{j=1}^{i-1} \sigma_j \delta_j\right)$$

Wherein $\sigma_i = 1$; $c_i$ is the color value (three-primary-color vector) of the $i^{th}$ sampling point; $\delta_i$ is the density value of the $i^{th}$ sampling point. The density value ranges from 0 to 1. The range of the color value is from 0 to 255. That is, after obtaining the color values of a plurality of sampling points of a sampling ray through the NeRF model, the processor 110 calculates, based on the color values of the plurality of sampling points from near to far according to the direction of the ray by the above formula, a composite color value (i.e., a color value corresponding to this sampling ray) of the sampling ray.

After obtaining color values of the plurality of sampling rays of each wrapping mesh coordinate, step (3) can be performed to obtain color vectors of each wrapping mesh coordinate.

Step (3): the server 100, by the spherical coordinate distribution function algorithm, performs encoding to the plurality of color values of the plurality of sampling rays to obtain a color vector corresponding to the wrapping mesh coordinate.

In more detail, step (3) includes: steps (3-1)~steps (3-3).

Step (3-1): calculating N spherical harmonic function bases of each sampling ray according to the spherical coordinate angle of the sampling ray, wherein N is a predetermined base number corresponding to the spherical coordinate distribution function algorithm, where N is 1, 4, 9, 16, or 25. N can be predetermined. The more bases, the better the color details can be described by the spherical harmonic function, but the higher number of viewing angles is required.

Specifically, in an embodiment, the direction vector d (x,y,z) of a sampling ray can be calculated based on the corresponding spherical coordinate angle (θ, φ), i.e., d (x, y, z)=(cos (θ) cos (φ), sin (φ), sin (θ) cos (φ)).

Next, each spherical harmonic function base is calculated based on the direction vector d.

In the embodiment, the spherical harmonic function bases can be categorized into 4 levels. Each level has a different number of bases.

The spherical harmonic function base at level 0 has 1 base (base[0]), which is calculated as: base[0]= 0.28209479177387814.

The spherical harmonic function bases at level 1 has 3 bases (base[1]-base[3]), which are calculated as: base[1]= 0.4886025119029199*y; base[2]=0.4886025119029199*z; base[3]=0.4886025119029199*x.

The spherical harmonic function bases at level 2 has 5 bases (base[4]-base[8]), which are calculated as: base[4]= 1.0925484305920792*x*y; base[5]= 1.0925484305920792*y*z; base[6]= 0.9461746957575601*zz−0.31539156525251999; base[7]= 1.0925484305920792*x*z; base[8]=0.5462742152960396* (xx−yy).

The spherical harmonic function bases at level 3 has 7 bases (base[9]-base[15]), which are calculated as: base[9]− 0.5900435899266435*y*(3*xx−yy); base[10]= 2.890611442640554*x*y*z; base[11]= 0.4570457994644658*y*(5*zz−1); base[13]− 0.4570457994644658*x*(5*zz−1); base[12]− 0.3731763325901154*z*(5*zz−3); base[14]= 1.445305721320277*z*(xx−yy); base[15]− 0.5900435899266435*x*(xx−3*yy).

The spherical harmonic function bases at level 4 has 9 bases (base[16]-base[24]), which are calculated as: base [16]=2.5033429417967046*x*y*(xx−yy); base[17]= 1.7701307697799304*y*z*(3*xx−yy); base[18]− 0.9461746957575601*x*y*(7*zz−1); base[19]= 0.6690465435572892*y*z*(7*zz−3); base[20]− 0.10578554691520431*(35*zz*zz−30*zz+3); base[21]− 0.6690465435572892*x*z*(7*zz−3); base[22]− 0.47308734787878004*(xx−yy)*(7*zz−1); base[23]= 1.7701307697799304*x*z*(xx−3*yy); base[24]= 0.6258357354491761*(xx*(xx−3*yy)−yy*(3*xx−yy)).

Step (3-2): calculating a three-primary-color contribution vector of each sampling ray according to a three-primary-color vector value of the color value of the sampling ray and the calculated N spherical harmonic function bases. Specifically, assuming that a spherical harmonic function base of level 4 is used, based on the spherical coordinate angle of a sampling ray, the obtained spherical harmonic function base vectors are [base[0], base[1], . . . , base[24]]. Processor 110 multiplies the spherical harmonic function base vectors [base[0], base[1], . . . , base[24]] with the three-primary-color vector $\hat{C}$[R,G,B] of the sampling ray to obtain a three-primary-color contribution vector OC(j): {[base[0] * R, base[1]*R, . . . , base[24]*R, . . . , base[24]*R, . . . , base[24]*R]] . . . , base[24]*R], [base[0]*G,base[1]* G, . . . , base[24]*G], [base[0]*B,base[1]*B, . . . , base[24]*B]}.

Step (3-3): calculating an average of the three-primary-color contribution vector of each sampling ray corresponding to the wrapping mesh coordinate as the color vector corresponding to the wrapping mesh coordinate.

Specifically, after obtaining the three-primary-color contribution vectors of all sampling rays corresponding to a wrapping mesh coordinate, the three-primary-color contribution vectors of all sampling rays are then summed and simply averaged (e.g., by dividing by M) to compute an average SH(p) of the three-primary-color contribution vectors, as illustrated in the following equation:

$$SH(p) = \frac{\sum_{j=1}^{M} OC(j)}{M}$$

Wherein p is the corresponding wrapping mesh coordinate; M is the number of sampling rays of each wrapping mesh coordinate; and OC(j) is the three-primary-color contribution vector of the $j^{th}$ sampling ray. The average value SH(p) will be used as the color vector corresponding to the wrapping mesh coordinate p.

After obtaining a color vector of each wrapping mesh coordinate, step (4) can be performed.

Figure 6:
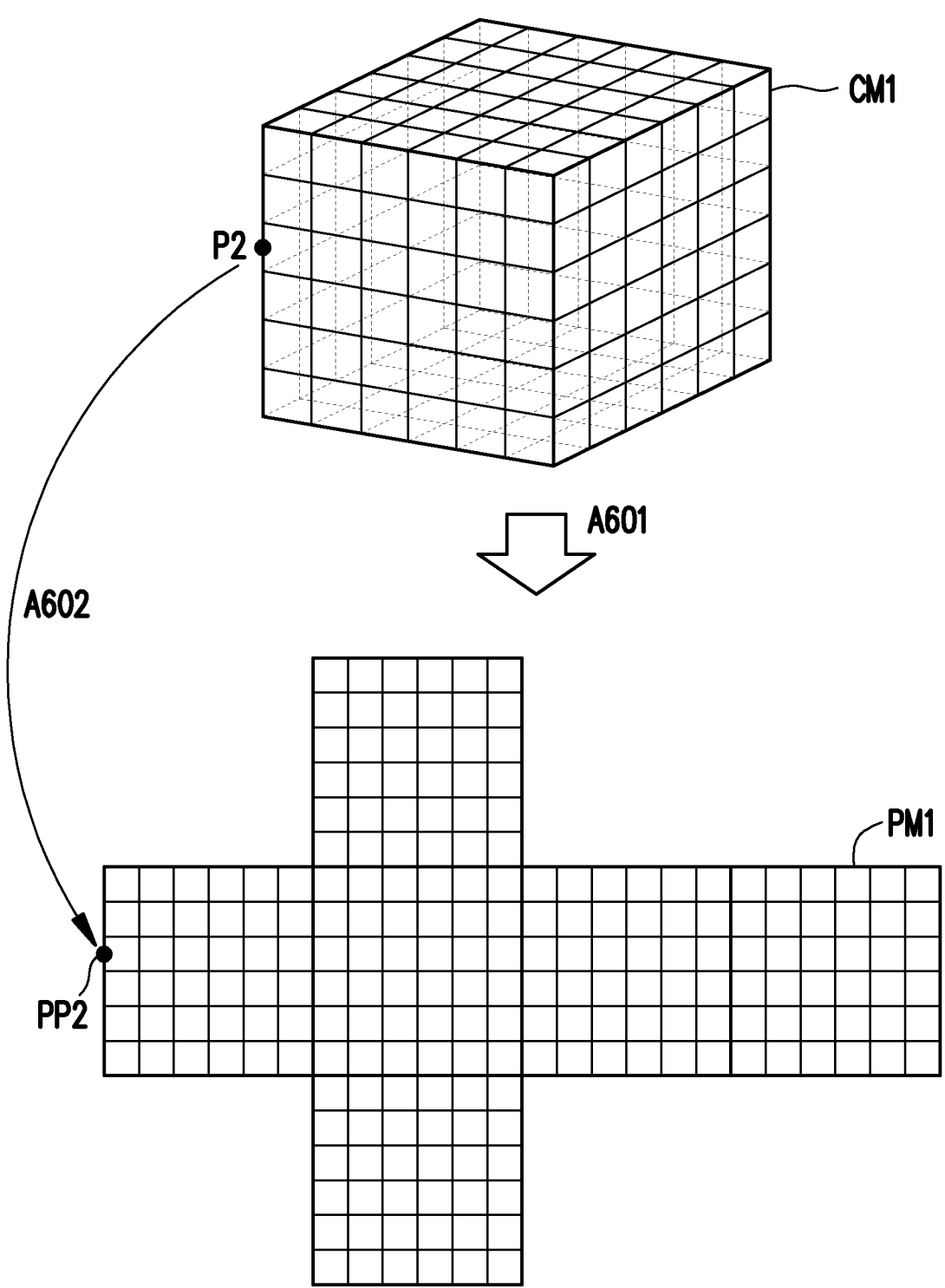
FIG. 6 is a schematic diagram of a 2D texture mesh mapped to a 3D wrapping mesh according to an embodiment of the present invention.

Step (4): the server 100 stores the color vector into a texture pixel of the 2D texture mesh mapped to the wrapping mesh coordinate (e.g., as shown by the arrow A602 in FIG. 6, the color vector of the wrapping mesh coordinate P2 of the 3D wrapping mesh CM1 is stored into the texture pixel PP2 of the 2D texture mesh PM1). All texture pixels of the resulting 2D texture mesh can be regarded as a set of 3-dimensional data, with the length and width being the resolution of the 2D texture mesh, and the depth being the number of 3*spherical harmonic function bases. In an embodiment, all texture pixels of a 2D texture mesh may be split into 2D RGB image files of the same number as the spherical harmonic function bases to be stored.

Step (5): after storing the color vector corresponding to all of the wrapping mesh coordinates of the 3D wrapping mesh into all of the texture pixels of the 2D texture mesh, generating, by the server, a color record file corresponding to the 3D object according to the 3D wrapping mesh and the 2D texture mesh.

Specifically, the color record file includes model files of the 3D wrapping mesh and the 2D texture mesh. The model file of the 3D wrapping mesh records the 3D coordinates of each wrapping mesh coordinate of the 3D wrapping mesh. The model file for a 2D texture mesh records the 2D coordinates of the texture pixels in the 2D texture mesh and the color vectors they are stored in. The mapping relationship between the texture pixels of the 2D mapping mesh and the wrapping mesh coordinates of the 3D wrapping mesh may be recorded, e.g., in a mapping table in the color record file, in the model file of the 3D wrapping mesh or the model file of the 2D mapping mesh.

The color record file may be stored in an object database of the storage circuit unit 130 of the server 100. For example, the e-commerce platform's server may store a color record file corresponding to a 3D object image of a product into the object database and corresponding to that product. The color record file can be called from the product's display page on the e-commerce platform.

Referring back to FIG. 2, in step S240, the user terminal 200 downloads the color record file corresponding to the 3D object, wherein the color record file comprises the 2D texture mesh and a plurality of color vectors respectively stored in a plurality of texture pixels of the 2D texture mesh. For example, a user activates a product display interface for a particular product of an e-commerce platform visited by the user via a browser or application program run by the user terminal 200. This product display interface causes that controlling the browser or the application program to download a color record file corresponding to the particular product.

Next, in step S250, the user terminal 200 determines a plurality of display rays respectively corresponding to the plurality of texture pixels of the 2D texture mesh according to a specified viewing angle corresponding to an applied input operation. For example, after downloading the color record file, the executed product display interface presents a display image of a 3D object corresponding to the particular product using a predefined viewing angle or a desired viewing angle (also known as a specified viewing angle) which allows the user to select/set.

The processor 210 may determine a viewing position based on a specified viewing angle (such as the camera depicted in FIG. 7A) to generate a plurality of display rays based on that viewing position.

Figure 7A:
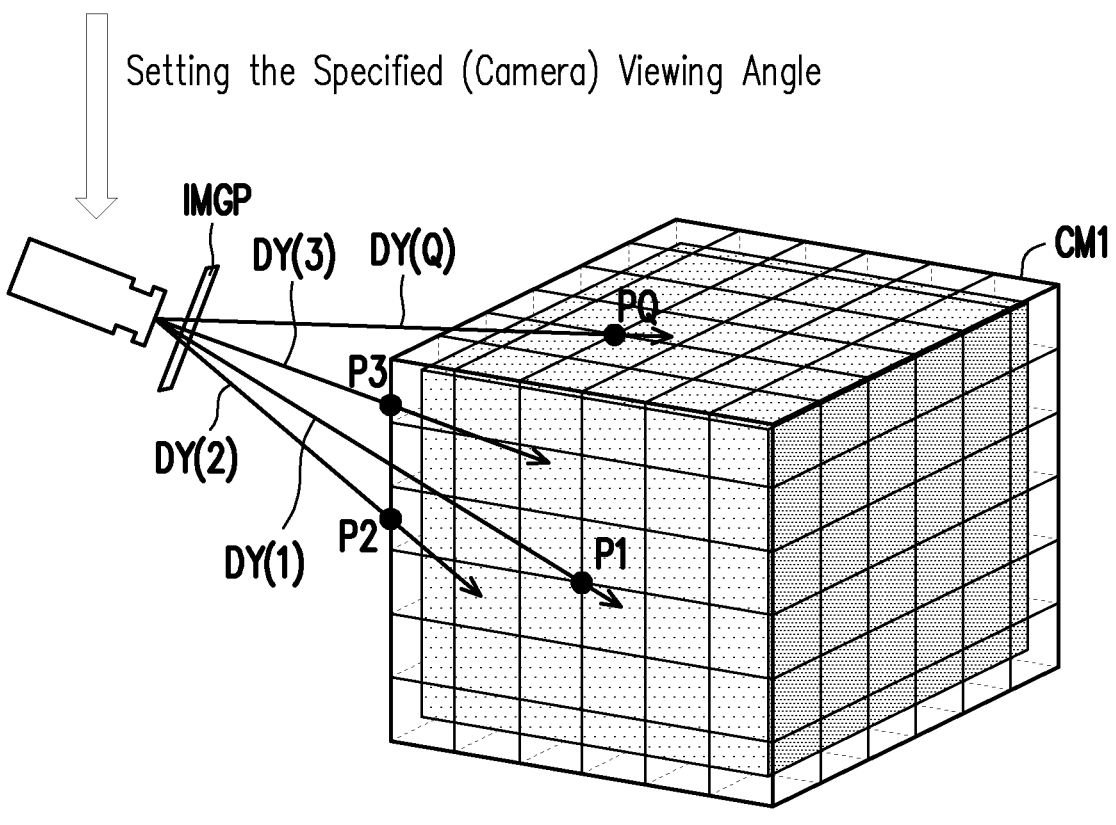
FIG. 7A is a schematic diagram of multiple display rays at specified viewing angles according to an embodiment of the present invention.

For example, referring to FIG. 7A, the processor 210 may generate a plurality of display rays DY(1)~DY (Q) centered from the viewing position based on a specified viewing angle, where the display rays DY(1)~DY (Q) will be equal to the total number of pixels of the display image/display plane IMGP. That is, one display pixel of the display image IMGP corresponds to one display ray. Each display ray will have a different spherical coordinate angle and traverse to a different wrapping mesh coordinate point of the 3D wrapping mesh CM1.

In another embodiment, the processor 210 may determine, based on a specified viewing angle, a portion of first 2D texture mesh, that corresponds to the specified viewing angle, from the 2D texture mesh mapped to the 3D wrapping mesh CM1 (not all of the wrapping mesh coordinates will be crossed by the display rays), and identify a spherical coordinate angle of the display ray corresponding to each texture pixel of the first 2D texture mesh according to the position of each texture pixel of the first 2D texture mesh and the specified viewing angle.

After determining the plurality of display rays corresponding to the specified viewing angle, step S260 is performed. In step S260, the user terminal 200 obtains, according to the plurality of display rays, a color value of each of a plurality of display pixels of a 2D display image corresponding to the 3D object at the specified viewing angle from the 2D texture mesh of the color record file.

In more detail, step S260 includes: determining, by the user terminal 200, according to the plurality of display rays and the 2D texture mesh, a first 2D texture mesh of a part of the 2D texture mesh, wherein the first 2D texture mesh corresponds to the 2D display image; and calculating, by the user terminal 200, according to a first color vector of each of a plurality of first texture pixels of the first 2D mapping mesh and the display rays, a color value of each of the first texture pixels at the specified viewing angle as a color value of each of the display pixels of the 2D display image by the spherical coordinate distribution function algorithm. The plurality of display pixels of the 2D display image are in a one-to-one mapping relationship with the plurality of first texture pixels of the first 2D texture mesh.

For example, referring to FIG. 7B, in the case of a display ray DY (2) crossing the wrapping mesh coordinate P2, the processor 210 identifies a spherical coordinate angle (ray angle) SA2 of the display ray DY2 crossing the wrapping mesh coordinate P2. Next, the processor 210 identifies a texture pixel (first texture pixel) PP2 mapped to the wrapping mesh coordinate P2 (A701), and reads a stored color vector CV2 from texture pixel PP2 (A702). Next, the processor 210 calculates a color value corresponding to the display ray DY2 based on that spherical coordinate angle SA2 and that color vector CV2.

In more detail, the above the step of calculating, the color value of each of the first texture pixels at the specified viewing angle by the spherical coordinate distribution function algorithm includes: for a target first texture pixel among the plurality of first texture pixel, calculating, according to a target spherical coordinate angle of a target display ray across the target first texture pixel, a corresponding N target spherical harmonic function bases; and performing an inner product operation on the N target spherical harmonic function bases and a target first color vector of the target first texture pixel to calculate the color value of the target first texture pixel at the specified viewing angle. For example, according to the target spherical coordinate angle, the corresponding direction vector d can be calculated, and the corresponding N target spherical harmonic function bases can be calculated by the above mentioned formula, so as to obtain the spherical harmonic function base vectors [base[0], base[1], . . . , base[24]] corresponding to the display ray. Next, an inner product operation is performed on the spherical harmonic function base vectors [base[0], base[1], . . . , base[24]] and the read color vectors, so that the obtained result of the calculation is used as the color value [R,G,B] of the target first texture pixel.

Finally, in step S270, the user terminal 200 displays the plurality of display pixels on a display of the user terminal 200 according to the color value of each of the plurality of display pixels, so as to display the 2D display image, wherein an appearance of the 3D object at the specified viewing angle is seen in real time by the 2D display image.

It should be noted that the provided method of the embodiment, by rendering/displaying the 2D display image directly using the calculated color values, enables the 2D display image to present the 3D object (or the corresponding actual object) at a specified viewing angle. Since the above processes does not need to deduce/determine the surface position/texture of a 3D object in the virtual space, and only need simple operations that do not consume computing resources, such as calculating the coordinates of texture pixels/display pixels corresponding to the viewing angle, reading color record files, and performing inner product operation.

It is worth noting that the scenarios assumed in the many examples, tables, and tables described above are exemplary only, and the present invention is not limited thereto.

Based on the above, to address the need for 3D product display in e-commerce, an innovative 3D object imaging method to address the limitations of traditional NeRF technology applied on devices with limited processing power is provided. The method includes: the server 100 generates a 3D wrapping mesh on the server side to completely surround the 3D object, and uses the mesh to pre-sample the 3D object using NeRF technology, and stores the pre-sampled colors into the corresponding 2D texture mesh. Then, at the user terminal 200, the corresponding display pixels can be quickly extracted from the 2D texture mesh based on the specified viewing angle to show how the 3D object looks like at the specified viewing angle. The provided 3D object imaging method not only dramatically reduces the amount of computation required to perform 3D imaging on user terminal 200, but also maintains the high quality and detail of 3D object images derived from the NeRF model, and allows user terminal 200 with limited computational power (e.g., smartphones and laptops) to smoothly display the derived 3D object images in real time. The provided method enables e-commerce platforms to instantly present 3D objects in multiple viewpoints, providing a more dynamic and engaging shopping experience. The display of the user terminal 200 is able to instantly and smoothly show the 2D display image of 3D products presented by the e-commerce platform from any viewing angle, which greatly enriches consumer interaction and increases the attractiveness of the presented product, and strongly promotes the conversion rate and user satisfaction.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A 3D object imaging method for a 3D object imaging system, wherein the system includes a server and a user terminal, the method comprising:

executing, by the server, a Neural Radiance Fields (NeRF) model to obtain a 3D object generated by the NeRF model in a virtual space;

generating, by the server, a 3D wrapping mesh, which completely surrounds the 3D object, in the virtual space, wherein the 3D wrapping mesh comprises a plurality of wrapping mesh coordinates;

performing, by the server, a color sampling operation on the 3D object according to the 3D wrapping mesh and a 2D texture mesh mapped to the 3D wrapping mesh to sample a color on the surface of the 3D object, so as to generate a color record file corresponding to the 3D object, wherein performing the color sampling operation comprises: for each of the plurality of wrapping mesh coordinates, generating a plurality of sampling rays across the respective wrapping mesh coordinate with different spherical coordinate angles to obtain a plurality of color values, and encoding the plurality of color values to generate a color vector for the respective wrapping mesh coordinate;

downloading, by the user terminal, the color record file corresponding to the 3D object, wherein the color record file comprises the 2D texture mesh and a plurality of color vectors respectively stored in a plurality of texture pixels of the 2D texture mesh;

determining, by the user terminal, a plurality of display rays respectively corresponding to the plurality of texture pixels of the 2D texture mesh according to a specified viewing angle corresponding to an applied input operation, wherein the plurality of display rays have different spherical coordinate angles;

obtaining, by the user terminal, according to the plurality of display rays, a color value of each of a plurality of display pixels of a 2D display image corresponding to the 3D object at the specified viewing angle from the 2D texture mesh of the color record file; and displaying, by the user terminal, the plurality of display pixels on a display of the user terminal according to the color value of each of the plurality of display pixels, so as to display the 2D display image, wherein an appearance of the 3D object at the specified viewing angle is seen in real time by the 2D display image.

2. The 3D object imaging method of claim 1, wherein the step of performing the color sampling operation on the 3D object according to the 3D wrapping mesh and the 2D texture mesh mapped to the 3D wrapping mesh to sample the color on the surface of the 3D object, so as to generate the color record file corresponding to the 3D object comprises:

generating, by the server, the 2D texture mesh according to the 3D wrapping mesh, where each texture pixel of the 2D texture mesh is mapped to each wrapping mesh coordinate point of the 3D wrapping mesh;

performing, by the server, for each wrapping mesh coordinate, following steps:

generating, according to the wrapping mesh coordinate, a plurality of sampling rays across the wrapping mesh coordinate with different spherical coordinate angles to obtain, by the plurality of sampling rays and the NeRF model, a plurality of color values respectively corresponding to the plurality of sampling rays;

encoding, by the server, by a spherical coordinate distribution function algorithm, the plurality of color values corresponding to the plurality of sampling rays to obtain a color vector corresponding to the wrapping mesh coordinate; and storing, by the server, the color vector into a texture pixel of the 2D texture mesh mapped to the wrapping mesh coordinate; and after storing the color vector corresponding to all of the wrapping mesh coordinates of the 3D wrapping mesh into all of the texture pixels of the 2D texture mesh, generating, by the server, a color record file corresponding to the 3D object according to the 3D wrapping mesh and the 2D texture mesh.

3. The 3D object imaging method of claim 2, wherein the step of obtaining, according to the display rays, the color value of each of the display pixels of the 2D display image corresponding to the 3D object at the specified viewing angle from the 2D texture mesh of the color record file comprises:

determining, by the user terminal, according to the plurality of display rays and the 2D texture mesh, a first 2D texture mesh of a part of the 2D texture mesh, wherein the first 2D texture mesh corresponds to the 2D display image; and calculating, by the user terminal, according to a first color vector of each of a plurality of first texture pixels of the first 2D mapping mesh and the display rays, a color value of each of the first texture pixels at the specified viewing angle as a color value of each of the display pixels of the 2D display image by the spherical coordinate distribution function algorithm.

4. The 3D object imaging method of claim 3, wherein the spherical coordinate angles of the plurality of display rays comprise an azimuth angle and a polar angle.

5. The 3D object imaging method of claim 4, wherein the step of generating, according to the wrapping mesh coordinate, the plurality of sampling rays across the wrapping mesh coordinate with different spherical coordinate angles comprises:

for each sampling ray among the plurality of sampling rays, generating a line segment of length $2r$ centered on the wrapping mesh coordinate of the sampling ray according to the corresponding spherical coordinate angle, wherein $r$ is a sampling range constant value of the NeRF model.

6. The 3D object imaging method of claim 5, wherein the step of to obtaining, by the plurality of sampling rays and the NeRF model, the plurality of color values respectively corresponding to the plurality of sampling rays comprises:

for each sampling ray among the plurality of sampling rays, determining $i$ sampling points on the sampling ray, wherein $i$ is a positive integer;

obtaining, by the NeRF model, an inferred NeRF color and a density value of each of the $i$ sampling points; and integrating the NeRF color values and the density values of the $i$ sampling points to obtain the color value corresponding to the sampling ray.

7. The 3D object imaging method as in claim 6, wherein the step of encoding, by the spherical coordinate distribution function algorithm, the plurality of color values corresponding to the plurality of sampling rays to obtain the color vector corresponding to the wrapping mesh coordinate comprises:

calculating $N$ spherical harmonic function bases of each sampling ray according to the spherical coordinate angle of the sampling ray, wherein $N$ is a predetermined base number corresponding to the spherical coordinate distribution function algorithm, where $N$ is 1, 4, 9, 16, or 25;

calculating a three-primary-color contribution vector of each sampling ray according to a three-primary-color vector value of the color value of the sampling ray and the calculated $N$ spherical harmonic function bases; and calculating an average of the three-primary-color contribution vector of each sampling ray corresponding to the wrapping mesh coordinate as the color vector corresponding to the wrapping mesh coordinate.

8. The 3D object imaging method of claim 7, wherein the step of calculating, the color value of each of the first texture pixels at the specified viewing angle by the spherical coordinate distribution function algorithm comprises:

for a target first texture pixel among the plurality of first texture pixels, calculating, according to a target spherical coordinate angle of a target display ray across the target first texture pixel, a corresponding $N$ target spherical harmonic function bases; and performing an inner product operation on the $N$ target spherical harmonic function bases and a target first color vector of the target first texture pixel to calculate the color value of the target first texture pixel at the specified viewing angle.

9. The 3D object imaging method of claim 1, wherein the 3D object reflects an actual appearance of a real object, and the method further comprises:

photographing the real object from a plurality of viewpoints to capture a plurality of object images; and inputting the plurality of object images into the NeRF model and the NeRF model performs an inference operation to generate the 3D object reflecting the real object, wherein the 3D object is rotated to simulate the actual appearance of the real object in different viewing angles.

10. A 3D object imaging system, comprising:
a server; and
a user terminal,
wherein the server executes a Neural Radiance Fields (NeRF) model to obtain a 3D object generated by the NeRF model in a virtual space,
wherein the server generates a 3D wrapping mesh, which completely surrounds the 3D object, in the virtual space, wherein the 3D wrapping mesh comprises a plurality of wrapping mesh coordinates,
wherein the server performs a color sampling operation on the 3D object according to the 3D wrapping mesh and a 2D texture mesh mapped to the 3D wrapping mesh to sample a color on the surface of the 3D object, so as to generate a color record file corresponding to the 3D object, wherein performing the color sampling operation comprises: for each of the plurality of wrapping mesh coordinates, generating a plurality of sampling rays across the respective wrapping mesh coordinate with different spherical coordinate angles to obtain a plurality of color values, and encoding the plurality of color values to generate a color vector for the respective wrapping mesh coordinate,
wherein the user terminal downloads the color record file corresponding to the 3D object, wherein the color record file comprises the 2D texture mesh and a plurality of color vectors respectively stored in a plurality of texture pixels of the 2D texture mesh,
wherein the user terminal determines a plurality of display rays respectively corresponding to the plurality of texture pixels of the 2D texture mesh according to a specified viewing angle, wherein the plurality of display rays have different spherical coordinate angles,
wherein the user terminal obtains, according to the plurality of display rays, a color value of each of a plurality of display pixels of a 2D display image corresponding to the 3D object at the specified viewing angle from the 2D texture mesh of the color record file,
wherein the user terminal displays the plurality of display pixels on a display of the user terminal according to the color value of each of the plurality of display pixels, so as to display the 2D display image, wherein an appearance of the 3D object at the specified viewing angle is seen in real time by the 2D display image.

* * * * *